United States Patent
Vanover

(10) Patent No.: US 11,443,055 B2
(45) Date of Patent: Sep. 13, 2022

(54) INFORMATION SHARING IN A COLLABORATIVE, PRIVACY CONSCIOUS ENVIRONMENT

(71) Applicant: Microsoft Technology Licensing, LLC, Redmond, WA (US)

(72) Inventor: Brian Vanover, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 617 days.

(21) Appl. No.: 16/415,603

(22) Filed: May 17, 2019

(65) Prior Publication Data

US 2020/0364363 A1 Nov. 19, 2020

(51) Int. Cl.
| | |
|---|---|
| *G06F 21/00* | (2013.01) |
| *G06F 21/62* | (2013.01) |
| *G06F 16/2455* | (2019.01) |
| *G06F 16/9536* | (2019.01) |
| *H04L 9/40* | (2022.01) |

(52) U.S. Cl.
CPC .... *G06F 21/6227* (2013.01); *G06F 16/24556* (2019.01); *G06F 16/9536* (2019.01); *H04L 63/104* (2013.01)

(58) Field of Classification Search
CPC ........... G06F 21/6227; G06F 16/24556; G06F 16/9536; G06F 16/9035; G06F 21/00; G06F 21/62; G06F 16/93; H04L 63/104
See application file for complete search history.

(56) References Cited

U.S. PATENT DOCUMENTS

| | | | |
|---|---|---|---|
| 2002/0099685 A1* | 7/2002 | Takano | G06F 16/93 |
| 2007/0208714 A1* | 9/2007 | Ture | G06F 16/951 |
| 2009/0150169 A1 | 6/2009 | Kirkwood et al. | |
| 2010/0106719 A1* | 4/2010 | Donato | G06F 16/355 |
| | | | 707/728 |
| 2012/0191715 A1* | 7/2012 | Ruffner | G06F 16/93 |
| | | | 707/738 |
| 2012/0209885 A1 | 8/2012 | Ramakrishnan et al. | |
| 2013/0238659 A1 | 9/2013 | Roitman et al. | |
| 2014/0071911 A1* | 3/2014 | Horiuchi | H04L 5/0048 |
| | | | 370/329 |

(Continued)

FOREIGN PATENT DOCUMENTS

WO 2017020947 A1 2/2017

OTHER PUBLICATIONS

"International Search Report and Written Opinion Issued in PCT Application No. PCT/US20/028599", dated Jul. 32, 2020, 10 Pages.

*Primary Examiner* — John B King
(74) *Attorney, Agent, or Firm* — Chin IP, PLLC

(57) ABSTRACT

A method that enables information sharing is described herein. The method includes receiving a query from a first collaborator at a content management system, wherein a relationship between the first collaborator and a second collaborator is maintained by the content management system. The method also includes determining query results in content stored at a second shard belonging to the second collaborator in response to the query, wherein the query results are relevant to a search based on the received query. Additionally, the method includes releasing the query results from the second shard in response to an indication from the second collaborator, and returning the released query results to the first collaborator.

20 Claims, 9 Drawing Sheets

(56) References Cited

U.S. PATENT DOCUMENTS

| | | | |
|---|---|---|---|
| 2014/0351958 A1* | 11/2014 | Sabulsky | G06F 21/62 |
| | | | 726/30 |
| 2015/0006534 A1* | 1/2015 | Konoshima | G06V 10/95 |
| | | | 707/737 |
| 2015/0088934 A1* | 3/2015 | Beckman | G06F 21/6227 |
| | | | 707/781 |
| 2015/0242505 A1* | 8/2015 | Uenoyama | G06F 16/9537 |
| | | | 707/722 |
| 2016/0085757 A1* | 3/2016 | Rachi | G06F 16/3322 |
| | | | 707/727 |
| 2019/0266336 A1* | 8/2019 | Scheideler | G06F 21/6218 |
| 2019/0342352 A1* | 11/2019 | Liew | G06F 16/9035 |
| 2020/0186487 A1* | 6/2020 | Qian | H04L 67/306 |

* cited by examiner

100

800

INFORMATION SHARING IN A COLLABORATIVE, PRIVACY CONSCIOUS ENVIRONMENT

BACKGROUND

Access controls for content, e.g., documents, are often overridden by content owners who desire finer control over which persons or organizations can access their content. The access controls are often circumvented using a combination of manual access requests and distribution groups. For example, content owners may manage access to their content by joining a distribution group and granting the distribution group access to all content. Access is also handled on a manual request basis, such as emailing a coworker to grant access to a document. However, sharing content using manual access requests does not solve issues related to discovery of content, as a user cannot request access to content that the user does not know exists. Conventional techniques, such as granting members of a distribution group access to all content, results in a loss of finer-grained controls on select content while maintaining a semi-collaborative environment. Moreover, like manual access requests, distribution groups often need to be discovered such that a requester is aware of the distribution group from which content may be available.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an embodiment described herein, a method is described. The method includes receiving a query from a first collaborator at a content management system, wherein a relationship between the first collaborator and a second collaborator is maintained by the content management system. The method also includes determining query results in content stored at a second shard belonging to the second collaborator in response to the query, wherein the query results are relevant to a search based on the received query. Additionally, the method includes releasing the query results from the second shard in response to an indication from the second collaborator, and returning the released query results to the first collaborator.

In an embodiment described here, a system is described. The system includes a web client to receive a query from a first collaborator, wherein a relationship between the first collaborator and a second collaborator is maintained by a content management system. The system also includes a search federator to federate the query and issue a federated search request based on the query from the first collaborator to the second collaborator and a second query processor to determine remote query results at a second shard belonging to the second collaborator in response to a federated search request from the search federator. Additionally, the system includes a content management server executing a content management service to release query results from content on the second shard owned by the second collaborator to the first collaborator.

In an embodiment described herein, a computer readable medium is described. The computer readable medium, in execution, includes receiving a query from a first collaborator at a content management system, wherein a relationship between the first collaborator and a second collaborator is maintained by the content management system. The computer readable medium, in execution, also includes determining query results in content stored at a second shard belonging to the second collaborator in response to the query, wherein the query results are relevant to a search based on the received query. Additionally, computer readable medium, in execution, includes releasing the query results from the second shard in response to an indication from the second collaborator and returning the released query results to the first collaborator.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
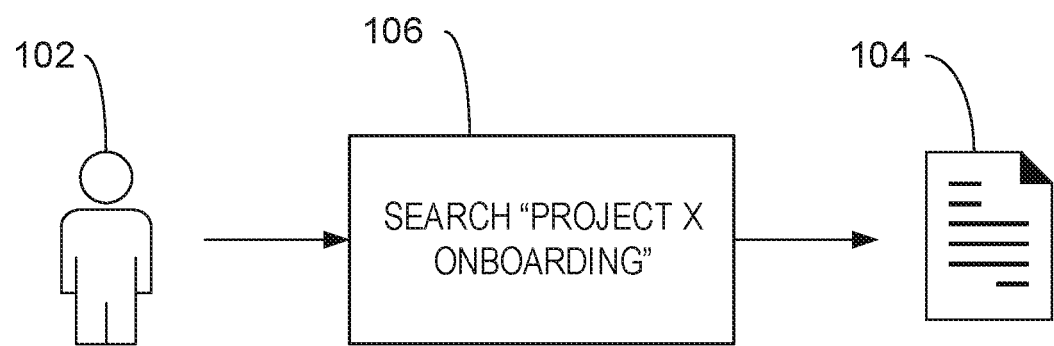
FIG. 1 is an illustration of a workflow in an open environment.

Content owners often engage in many different relationships that could benefit from collaboration and information sharing of content. For example, the World Health Organization (WHO) acts as a broker of information and trust by fostering the sharing of epidemiological data amongst the world's medical institutions. State actors decide what and how much information to release to WHO which, in turn, validates and aggregates the shared data. However, even though countries may wish to share this data, they may not feel comfortable, for example, disclosing patient identities. This is applicable in the corporate domain as well. A colleague may have no qualms sharing a document with onboarding instructions but may feel a bit more reserved sharing a schematic for a new, confidential project.

Thus, content owners desire the ability to allow varying content access permissions to other users or collaborators in a content management system. As used herein, a content owner is defined as a user with control over content. The content owner may be an author of the content, and/or the content owner may be a steward of the content. A collaborator is a person or entity that can access content via the content management system. In some cases, a collaborator may be a distribution group. The collaborator may have defined relationships with other collaborators and can access the content of the other collaborators as described below. The collaborators typically own content. Content, as used herein, may refer to electronic data. The content includes, but is not limited to, images, audio, videos, documents, electronic messaging data, electronic mail data, web-based collaborative platform data, cloud storage data, other data, or any combination thereof. Enabling a content owner to grant certain collaborators access to particular content often requires significant costs, effort, and time. For example, a content owner of documentation on a confidential project may be required to disseminate the documentation to permitted colleagues on a case by case basis. The dissemination requires action by the content owner, such as physically causing the documentation to be transmitted or otherwise available to approved parties.

The present techniques enable information sharing in a collaborative, privacy conscious environment. In embodiments, the present techniques leverage the power of search technologies within a culture of sensitivity and information protection. In particular, the ability of a collaborator to control when their content is shared and with whom their content is shared enables searching of content that collaborators often make unavailable to search engines due to a lack of protection and control. The content management system according to the present techniques balances the capabilities of modern information retrieval systems with user-defined, case-by-case access control to enhance information sharing while protecting privacy and/or confidentiality. The content management system described herein is significantly advantageous over manual access requests as it enables discovery of content that may be undiscoverable under conventional techniques. Further, an interface of the content management system facilitates quick and efficient delivery of content. The content management system is more convenient, collaborative, and secure than distribution groups, as relationships between collaborators can be easily updated and changed to reflect the present status of relationships. Moreover, the collaborative controls enable a finer-grained control when compared to conventional techniques, being more permissive than no shared access and less permissive than team-wide distribution groups.

Figure 7:
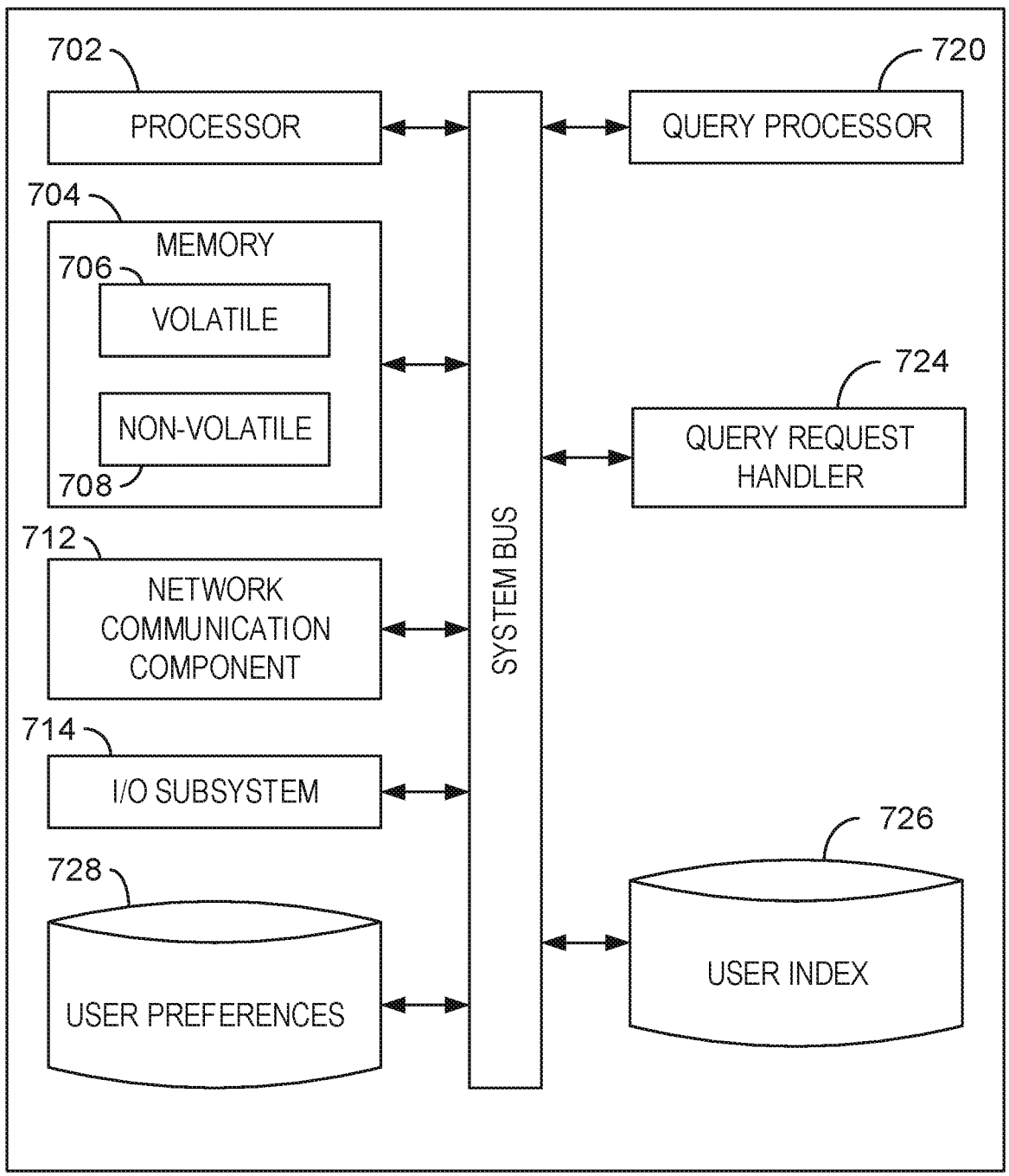
FIG. 7 is a block diagram illustrating an exemplary computing system configured as a search engine according to aspects of the disclosed subject matter.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 7 discussed below, provides details regarding different systems that may be used to implement the functions shown in the figures.

Other figures may describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, medium, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device. While computer-readable media may reproduce and/or cause to deliver the computer-executable instructions and data to a computing device for execution by one or more processor via various transmission means and mediums including carrier waves and/or propagated signals, for purposes of this disclosure computer readable media or a computer readable medium expressly excludes carrier waves and/or propagated signals.

FIG. 1 is an illustration of a workflow 100 in an open environment. The workflow 100 includes a user 102. As illustrated, the user 102 may issue a query 106. In the example of FIG. 1, the query 106 issued by the user 102 is a search for "Project X Onboarding." The query 106 returns content 104. In an example, the content returned may be document that includes information regarding the "Project X Onboarding." In an open environment, any user may access all content in a content management system via a query. Thus, the open environment is an environment with little to no access control of content. In such an environment, a content owner has little to no control over who can access and read documents stored within the content management system. For example, in FIG. 1 an owner of the content 104 does not control access to the content 104. If the content is available to the search engine executed by the content management system, the content is returned as a matching content item. To prevent searching across all content owned by a content owner, content owners often ensure that their content is stored beyond the reach of a search engine. As a result, content owners often spend more time preventing others from accessing their content in searchable locations instead of focusing on the generation of additional content and collaboration with regard to existing content. Moreover, the inability to control access to content may cause content owners to be less inclined to contribute content to the content management system to prevent over sharing.

Figure 2A:
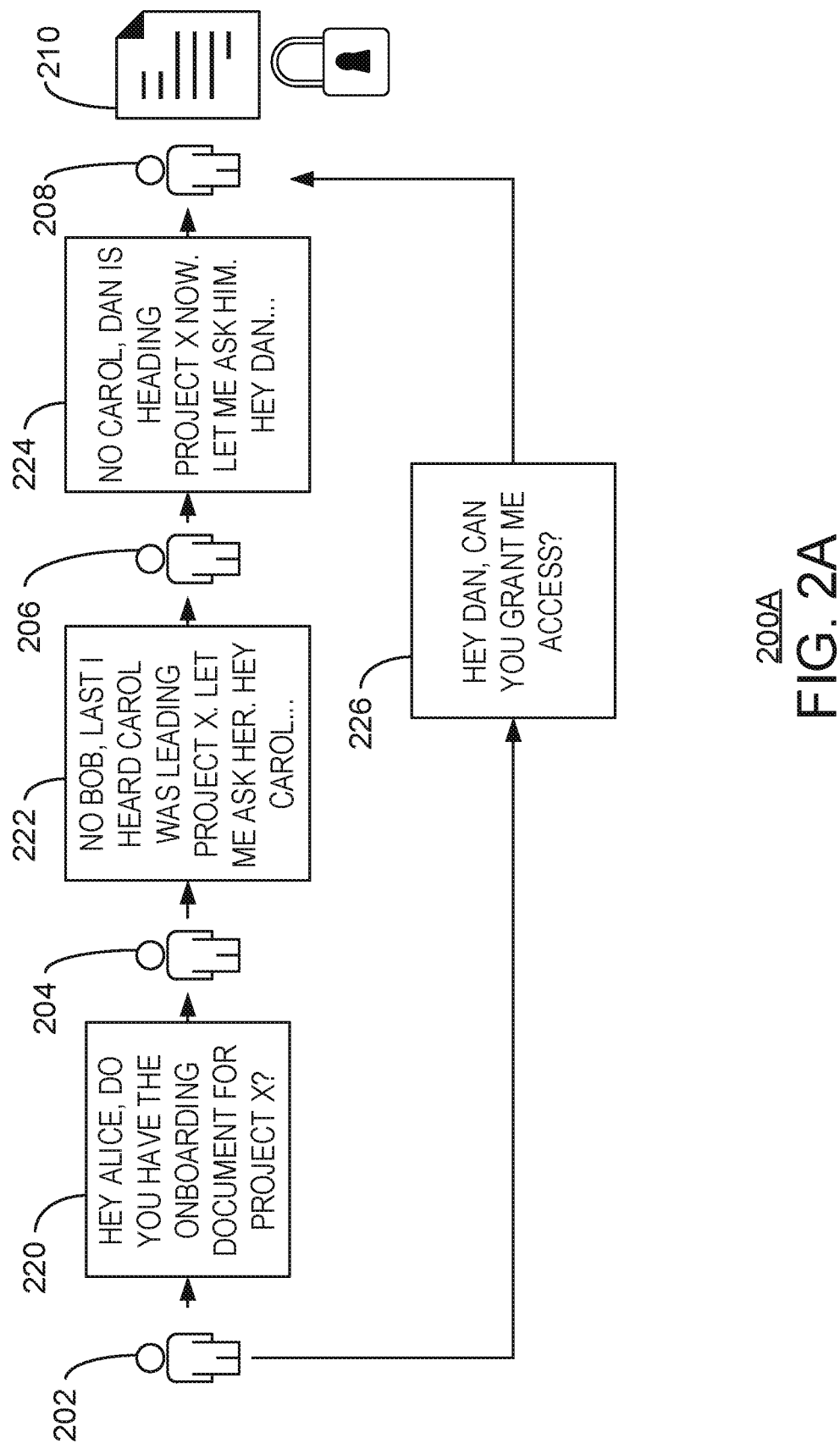
FIG. 2A is an illustration of a workflow in a closed, controlled, collaborative information environment.

FIG. 2A is an illustration of a workflow 200A in a closed, controlled, collaborative environment. The workflow 200A includes a plurality of collaborators. Each of the collaborators may also be a content owner. FIG. 2A includes a collaborator "Bob" 202, collaborator "Alice" 204, collaborator "Carol" 206, and collaborator "Dan" 208. In the example of FIG. 2A, collaborator Bob 202 issues a query seeking the onboarding document for Project X to the collaborator Alice 204. As illustrated, collaborator Dan 208 owns the onboarding document for Project X 210.

In the closed, controlled environment illustrated by the workflow 200A, collaborator Bob 202 is unaware that collaborator Dan owns the onboarding document for Project X. In this example, there are no known collaborative relationships between collaborator Bob 202, collaborator Alice 204, collaborator Carol 206, or collaborator Dan 208. No component of the workflow in FIG. 2A maintains a relationship between collaborators. Moreover, queries are issued at the whim of a collaborator, in a sequential fashion without any federation of the query. Three queries are issued to enable collaborator Bob 202 to determine that collaborator Dan 208 is the owner of the sought-after onboarding document for Project X.

First, at block 220, collaborator Bob 202 issues the query to collaborator Alice 204: "Hey Alice, do you have the onboarding document for Project X?" In turn, collaborator Alice communicates that she does not have the onboarding document for Project X and issues a new query to another collaborator. For second query, at block 222 collaborator Alice 204 issues the following response and query: "no Bob, last I heard Carol was leading Project X. Let me ask her. Hey Carol . . . ". For the third query, at block 224 collaborator Carol 206 issues the following response and query to collaborator Dan 208: "no Alice, Dan is heading Project X now. Let me ask him. Hey Dan . . . ". As illustrated, the desired document is not found until three sequential queries have been issued. After the third query is issued from collaborator Carol 206 to collaborator Dan 208 and Dan affirms that he owns the onboarding document for Project X, knowledge that Dan owns the onboarding document for Project X may flow from collaborator Carol to collaborator Bob 202. Thus, collaborator Bob 202 must go through three requests to discover the requested document. In some cases, collaborator Bob 202 must also issue a fourth query to Dan to retrieve the document. At block 226, collaborator Bob 202 issues a query to collaborator Dan 208 to retrieve the onboarding document for Project X.

The content management system according to the present techniques removes collaborator Alice 204 and collaborator Carol 206 from the retrieval process via a privacy-sensitive search engine which can release information to collaborator Bob upon approval from Dan. The present techniques are operable to enable a single query 226 from collaborator Bob 202 to collaborator Dan 208 based on a relationship between the pair of collaborators. Such a query will eliminate collaborator Alice 204 and collaborator Carol 206 from the query. In this manner, the retrieval process eliminates unnecessary actors and enables additional privacy by abstracting the query from collaborators. Abstracting the query from collaborators prevents a collaborator who is not recognized by the content management system from viewing the query used to obtain matching content items from the collaborator's content. Additionally, abstracting the query from collaborators prevents a collaborator who does not own content relevant to the query from receiving the query.

The content management system as described herein maintains a record of relationships between each pair of collaborators. A search according to the present techniques may be executed over all content available to the content management system. Notably, the present techniques enable a collaborator to decide whether to release content that is relevant to a query to another collaborator. If a query is posed to the content management system by a first collaborator, the results of a search based on the query on the content belonging to a particular collaborator are not released until that collaborator releases the content.

In an embodiment, a search according to the present techniques is executed over content that is owned by collaborators in a collaborative relationship with the collaborator that issued the query on which the search is based. In this scenario, the search may be executed on a subset or portion of content that is accessible via the content management system. A collaborator that issues a query may also limit the resulting search to a particular collaborator or group of collaborators. The group of collaborators may be identified individually by the collaborator issuing the query. Additionally, the group of collaborators may be identified by a common status, such as personal relationships, professional relationships, employment title, job function, work department. In this manner, a collaborator can control efficiency/speed of the search. Searching the content of a large number of collaborators may be at a lower speed when compared to searching the content of a smaller number of collaborators.

Figure 2B:
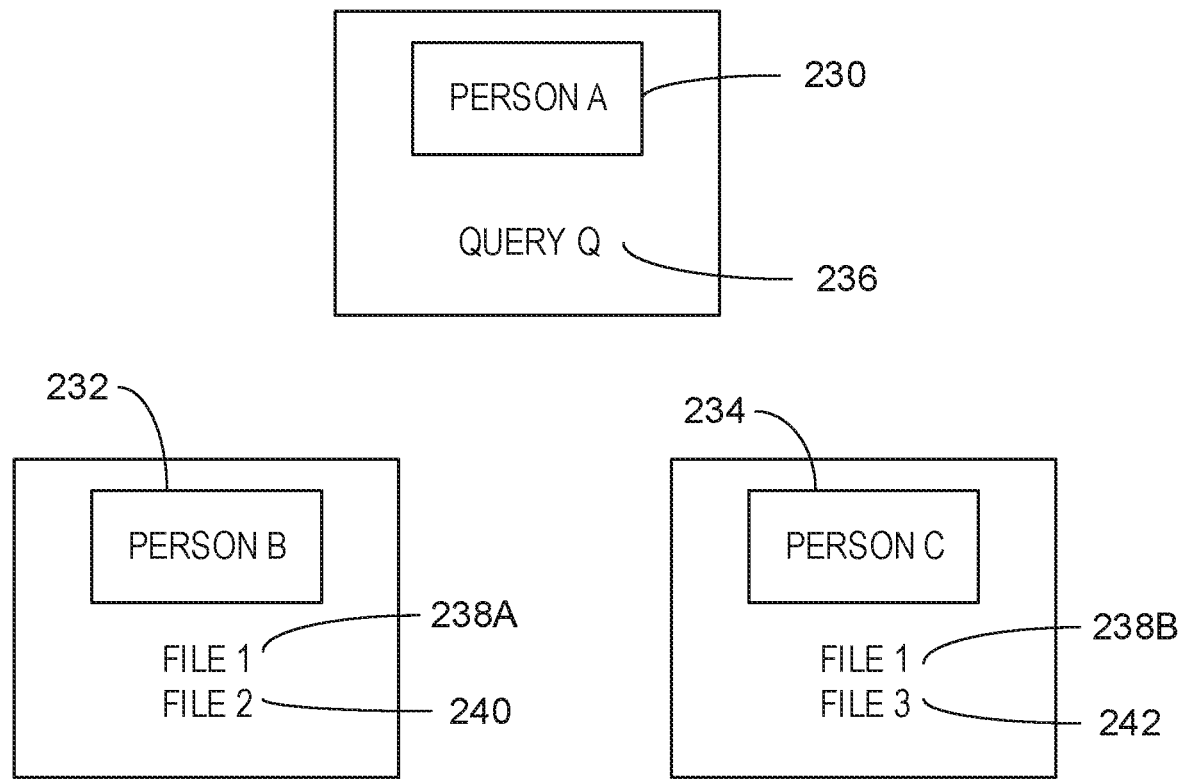
FIG. 2B is an illustration of a collaborative environment with three collaborators.

FIG. 2B is an illustration of a collaborative environment 200B with three collaborators. The three collaborators include Person A 230, Person B 232, and Person C 234, where Person A 230 is in a collaborative relationship with each of Person B 232 and Person C 234. In the event that Person A 230 poses a query Q 236 where Person B and Person C each own (have read/write, or administrator access, etc.) some matching content that is relevant to the query Q 230, the results may include a File 1 238A/238B, File 2 240, and File 3 242. The File 1 238A is owned by Person B, and an identical File 1 238B is owned by Person C. The File 2 240 is owned by Person B and the File 3 242 is owned by Person C. The File 1 238A/238B can be released to Person A 230 as soon as it is released by either Person B 232 or Person C 234. Similarly, File 2 240 can be returned as soon as it is released by Person B 232, and File 3 242 can be returned as soon as it is released by Person C 234. In FIG. 2B, content (such as File 1 238A/238B) of Person B 232 and Person C 234 are two different pieces of content. However, in the case where both Person B 232 and Person C 234 have joint ownership/administrative control over a piece of content, only one of Person B 232 or Person C 234 needs to release File 1 238A/238B for it to be released to the Person A 230, who posed the query.

If a first collaborator rejects sharing content owned by the first collaborator that is relevant to the posed query, or takes no action with regard to the content that was found to be relevant to the posed query, then the search ends or silently fails with respect to the first collaborator. In this example, to silently fail means that no results from the first collaborator are returned to the collaborator that posed the query, and the posing collaborator is not made aware the content relevant to the posed query exists or does not exist within the first collaborator's owned content. Accordingly, in this case results from the first collaborator's content are not released.

However, a second collaborator may release content relevant to the posed query found in the second collaborator's content. The release of the content may occur by copying the released content to the shard of the collaborator that posed the query. The content may also be released via a link that provides direct access to the content on the shard of the second collaborator. In embodiments, content may be released in several increments, depending on when each collaborator approves the release of his content that is determined to be relevant to the posed query. Alternatively, all content that is relative to the posed query may be released at once in response to all collaborators approving the release of their content.

Additionally, a collaborator may implement a policy to determine the access rights of another collaborator to his content. For example, the collaborator may own all content stored at the collaborator's personal shard. A shard may be an isolated space for storing content that is accessible only by the shard owner. In some cases, a shard owner may delegate access to the shard to others. Content may be stored in multiple shards. Accordingly, a shard is a separate storage area where an owner's content can be found, and that no other user has access to the storage area. A shard may refer to at least portion of a database. Each database shard may share a common schema. However, each shard has its own content that is independent of content stored or indexed by other database shards. In embodiments, the schema of each database refers to differing schema enabling permissions as directed by the owner of the shard. The collaborating user may allow another collaborator access, for example, to a particular folder containing content on the user's shard. In another example, each item of content stored on the collaborator's shard may be associated with a privacy level. The relationship between each pair of collaborators may be defined according to a privacy level. If a candidate matching content item in content owned by a first collaborator exists at a privacy level (e.g., confidential) outside of the privacy level (e.g., general) that a second collaborator can access, then a query from the second collaborator will not return the candidate result to the posed query. Moreover, the second collaborator will not be aware that the candidate result exists.

Figure 3:
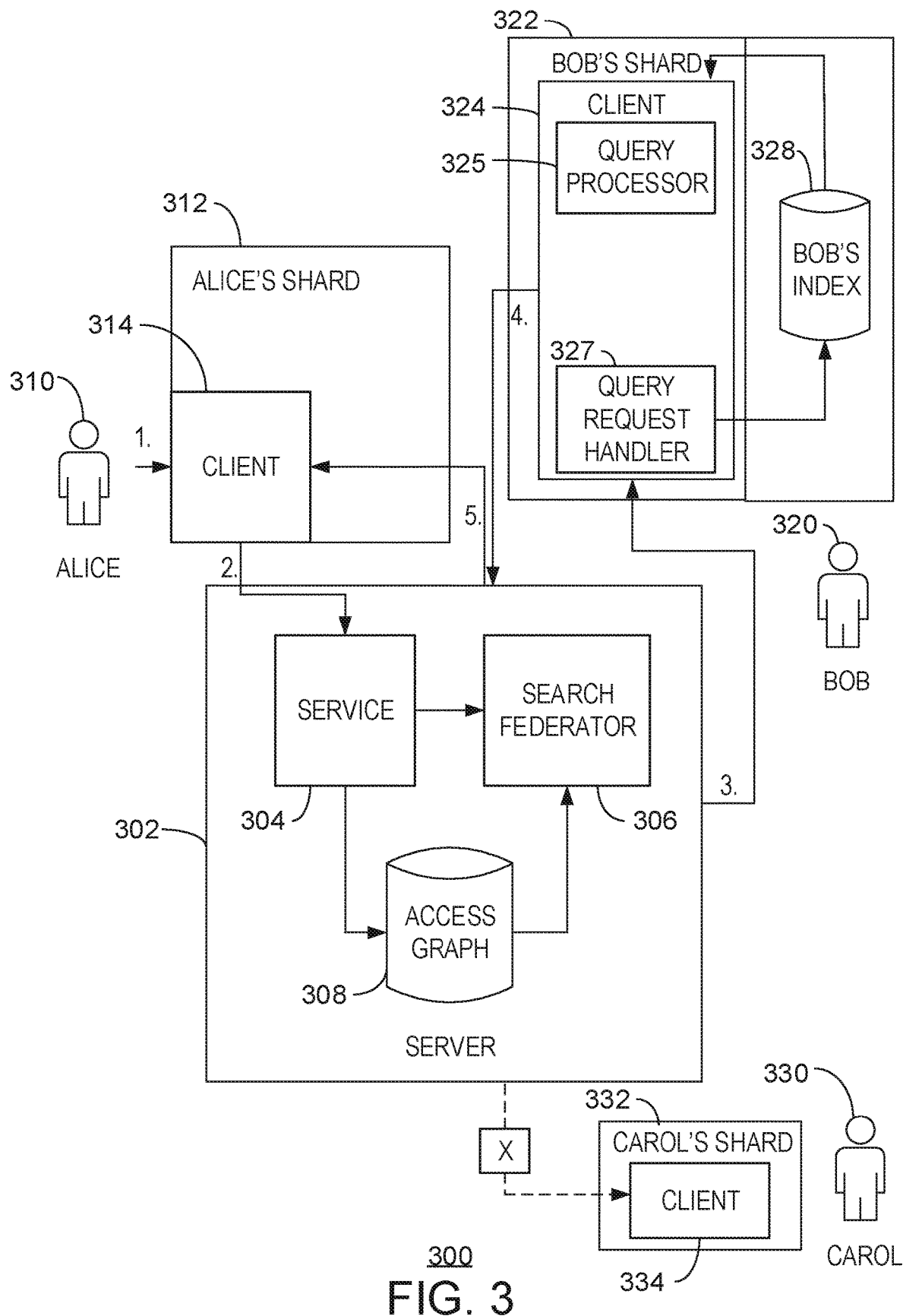
FIG. 3 is a block diagram of a system that enables information sharing in a collaborative, privacy conscious environment.

FIG. 3 is a block diagram of a system 300 that enables information sharing in a collaborative, privacy conscious environment. The system 300 includes content management clients that are located near a collaborator's owned content. Accordingly, the content management clients may be located within user shards. A query may be captured by a web client/interface and a search based on the query executed by a content management server 302. In some cases, the query may be captured via a desktop application or a mobile application. In embodiments, the content management server 302 may first execute the search over the shard of the collaborator who posed the query and will return the results to the collaborator via the interface. The content management server 302 may also manage collaborative controls and engage in result brokering. As used herein, collaborative controls refer to the processes available to a collaborator to allow or prevent access to the content owned by the collaborator. Result brokering, as used herein, refers to a process of serving as an intermediary between collaborators in negotiating the release of content. Referring to FIG. 3, the system 300 includes a collaborator Alice 310, a collaborator Bob 320 and a collaborator Carol 330. Each collaborator is associated with a shard. A content management client executes on each shard.

The content management server 302 includes a content management service 304, a search federator 306 and an access graph 308. As illustrated, collaborator Alice 310 owns corresponding shard 312. Collaborator Alice's shard 312 includes a content management client 314 and an index (not illustrated). Similarly, collaborator Bob 320 owns corresponding shard 322. Collaborator Bob's shard 322 includes a content management client 324 and an index 328. Collaborator Bob's content management client 324 includes a query processor 325 and a query request handler 327. Further, collaborator Carol 330 owns corresponding shard 332. Collaborator Carol's shard 322 includes a content management client 334 and an index (not illustrated). For ease of illustration, the content management client 314 and the content management client 334 are illustrated as black boxes. However, each content management client includes at least a query processor and a query request handler. Each query processor is responsible for conducting the search and returning the results to the content management server for further release processing. The content management server enables deduping and subsequently notifying collaborators that content they own or steward is eligible for release. Content that is eligible for release is relevant to a query posed by a collaborator. Moreover, for ease of illustration, Bob's shard 322 includes Bob's index 328. However, each shard includes an index and can include content associated with the index.

Consider a scenario where collaborator Alice 310 issues a query to the web interface of the content management service 304. First, the query is submitted to the content management server 302. A web interface may be used to capture the query via a POST request supported by the Hyper Text Transfer Protocol (HTTP) used to access the World Wide Web. The collaborator Alice 310 currently has a collaborative relationship with collaborator Bob 320 and not with collaborator Carol 330. As discussed below, collaborative relationships are identified and maintained via an access graph 308. At the content management server 302, a local and federated search is initialized. In particular, the content management service 304 may issue a search over Alice's personal shard 312. The search federator 306 first issues the search over Alice's shard, and if necessary, to Alice's collaborators. Accordingly, the interface used to capture the query issued from collaborator Alice 310 can be used to search content owned by Alice as well as the content of other collaborators. In embodiments, an initial search of the content owned by the collaborator who posed the query is executed to enable the deduping of results from other collaborators. In this manner, the other collaborators are not burdened to release results that the collaborator who posed the query can access without an additional search of content owned by the other collaborators.

In embodiments, the federated search enables the query to be applied against a plurality of indexes via a federated search request. The federated search may also enable de-duplication (deduping) of the matching content items collected against multiple indexes. Matching content items, as used herein, are content items that satisfy a federated search request that is based on a posed query. De-duping refers to a process of removing duplicate matching content items, as multiple collaborators may have saved copies of the same content on each of their shards. In an embodiment, a local search of the personal, owned content of the collaborator who posed the query is not executed. For example, Alice posed a query and may be aware of the content likely stored on her shard. Alice may know that the content likely stored on her shard does not satisfy her query. In this embodiment, a query posed by Alice may be federated and sent to collaborators that are discovered via the access graph 308, without issuing a search of Alice's personal shard.

The access graph 308 is used to determine the collaborators of a first collaborator that poses a query. Accordingly, the collaborator Alice 310 can pose the query to her collaborators (including collaborator Bob 320). The content management server 302 checks the access graph 308 to find Alice's collaborators. In embodiments, the access graph is a data structure that defines the relationships between collaborators. In embodiments, the access graph may also define the relationships between a collaborator and the public or other persons or organizations external to the content management service. In some cases, the access graph may be represented by an adjacency list or an adjacency matrix. The access graph may also be implemented as a map data structure with a plurality of key-value pairs. In this scenario, each collaborator corresponds to a key in the map data structure, and the associated value is a list of users with which a collaborative relationship exists.

The access graph 308 determines the persons, entities, organizations, or groups in a relationship with the collaborator who poses a query. Thus, in the example of FIG. 3, the access graph 308 is used to determine the relationships and resulting collaborators of collaborator Alice 310. The access graph indicates that the collaborator Alice 310 has a relationship with collaborator Bob 320. In regard to a query posed by collaborator Alice 310, collaborator Bob 320 receives the query since collaborator Alice 310 has a relationship with collaborator Bob 320. The access graph 308 also indicates that collaborator Alice 310 does not have a relationship with collaborator Carol 330. The search federator 306 poses the query to other collaborators based on the identified relationships. In the example of FIG. 3, the search federator 306 poses the query to Bob. The search federator 306 does not pose the query to collaborator Carol 330 because collaborator Alice 310 and the collaborator Carol 330 are not in a content sharing relationship as identified by the access graph 308.

A federated search request is received at Bob's shard 322. In particular, the query request handler 327 of the content management client 324 intercepts the federated search request. In embodiments, the query request handler 327 is a request handler that listens for or detects a federated search request and transmits the federated search request to the query processor 325. The query processor 325 will then process the federated search request by executing a search over the collaborator's content and retrieving the results from the collaborator's index.

Upon completion of a federated search request, the content found in response to the federated search request does not leave the respective shard on which it was found unless it is explicitly released by the owner of the content. Put another way, data is not copied from a collaborator's shard until it is released. In some cases, to protect client-server access inconsistencies, a final, authoritative access control validation is performed on the client side, at the shard, prior to the release of matching content items. In such a scenario, when a federated search request is received by the query request handler 327, it will invoke an access validator to ensure that the collaborative relationship still exists between the collaborator that posed the query and the collaborator that owns content that satisfies the query a search request based on the query.

Figure 4:
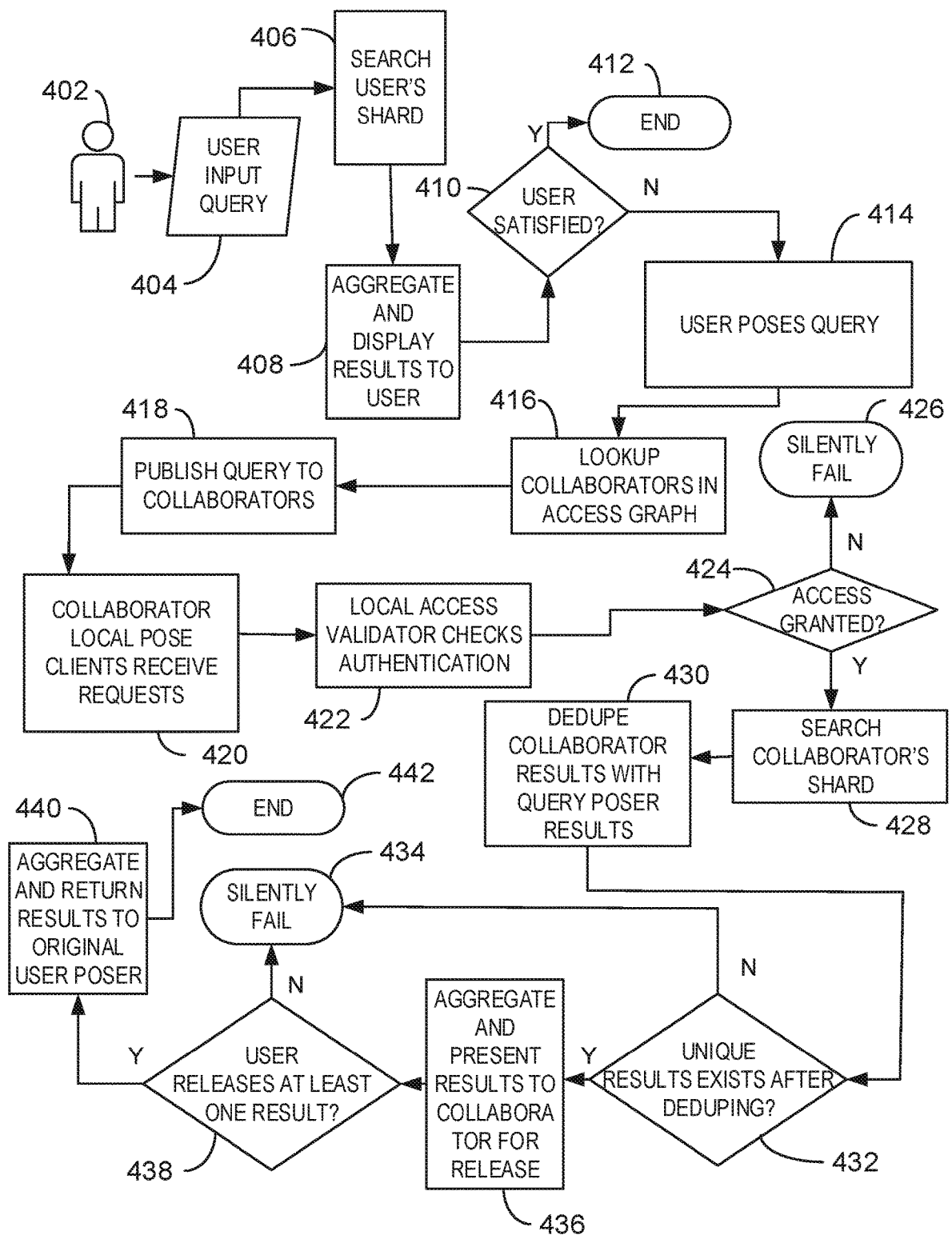
FIG. 4 is a block diagram of a content management workflow.

FIG. 4 is a block diagram of a content management workflow 400. A user 402 (e.g., collaborator) of the content management service issues a user input query 404. At block 406 the user input query 404 is used for a search of the user's personal shard. At block 408, the results of searching the user's personal shard are aggregated and displayed to the user 402. At block 410, a determination is made as to whether the user is satisfied with the results of a search across the user's own shard. To make this determination, a search request may be generated and executed over the content owned by the user that posed the query. The search request may be generated by a search federator. If the user is satisfied with the results, process flow continues to block 412, where the end of the search is reached. If the user is not satisfied with the results, process flow continues to block 414.

At block 414, a user poses the query to other collaborators. When the user 402 poses the user input query 404 to collaborators, the user input query is processed by a search federator at a content management server. At the content management server, optional filters may be applied to the query. In examples, a filter is used to restrict the query to a subset of the collaborators as given by the access graph. The query may be presented to other collaborators in the form of a federated search request. At block 416, the collaborators of the user that posed query are determined. In embodiments, the collaborators are determined using an access graph. At block 418, the query is published to the collaborators found in the access graph in the form of a federated search request.

At block 420, the local content management clients of the collaborators receive the federated search requests. The search federator then enables a simultaneous search of multiple content stores based on the query by issuing a federated search request. The query request handler at a content management client may listen for the federated search request. As used herein, listening for the federated search request may refer to the query request handler receiving the federated search request as pushed from the search federator of the content management server. At block 422, a local access validator of the content management client may authenticate the federated search request. The local access validator may be a redundant check that the collaborator who posed the intercepted federated search request is in a relationship with the particular collaborator. At block 424, each content management client executing on a shard determines if the user 402 has been authenticated and granted access to the personal shard of the corresponding collaborator. If the user 402 is not granted access, process flow continues to block 426 where the query fails. As used herein, to silently fail means to return zero results without indicating to the user that no access to the collaborators shard was provided. If the user 402 is granted access, process flow continues to block 428.

At block 428, the collaborator's shard is searched based on the federated search request. After matching content items are obtained from the collaborator's shard, at block 430 the matching content items from the collaborator's shard are deduped with the initial matching content items found at the shard of user 402, if any. Process flow continues to block 432, where it is determined if unique results exist after the deduping. If no unique results exist after deduping, process flow continues to block 434 where the query silently fails. If unique matching content items exist after the deduping, process flow continues to block 436. As used herein, unique matching content items are results of the federated search request that are not duplicates of other matching content items found in content stores pursuant to the same federated search request. At block 436, the results are aggregated and presented for release by the collaborator that owns the matching content items.

At block 436, it is determined if the collaborator allows the release of at least one matching content item. If the collaborator does not allow the release of at least one content item, the search silently fails at block 434. If the collaborator does allow release of at least one content item, process flow continues to block 440. At block 440, the results are aggregated and returned to the original query poser, user 402. Upon the return of matching content items, the search ends at block 442.

Thus, as illustrated by the workflow 400, a first collaborator may pose a query to a search engine via a web interface. In some cases, the search engine searches the first collaborator's personal content. In embodiments, the search is based on the contents of the first collaborator's shard. The matching content items that are determined to be relevant to the query (e.g., query results) may be aggregated and displayed to the first collaborator. If the first collaborator is satisfied, the search ends. If the first collaborator is not satisfied, the first collaborator may pose the query to other collaborators, including a second collaborator. When the first collaborator poses the query, the first collaborator can specify filters to be applied to collaborators, such as aliases and groups to include in the search.

The content management service determines the collaborators in a relationship with the first collaborator using the access graph. The content management service then publishes the query to those collaborators in a relationship with the first collaborator via a federated search request. The query processor at a content management client searches the personal shard of a collaborator and returns the matching content items as query results to the content management service for processing. The processing includes deduping the query results, notifying and waiting for optional release by collaborators who own the content included in the query results, then returning to original poser the processed query results. The content management service may also process the results determined to be relevant to the query and dedupes these results from the other collaborators with results from the first collaborator. As described herein, deduping results prevents other collaborators from releasing results the user can access. Thus, deduping the results enables the removal of duplicate matching content items from a set of matching content items and prevents overburdening a collaborator with redundant requests. If no unique results exist after deduping, the process silently fails without returning results.

In embodiments, a local access validator double checks that first collaborator posing the query has permission to search the collaborator's shard. These permissions are managed at will by a user interface, and a collaborator can add, delete, or modify the permissions and relationships at any time. Here, if access is denied to the first collaborator, the process silently fails and returns no results to the user.

After deduping the results, the owner(s) of the query results are presented with a notification that their content was included as a matching content item in response to the query from the first collaborator. The notification may include the identity of the collaborator who posed the query, as well as the query itself. In response to the notification, each owner of at least one matching content item can release their respective content to the collaborator who posed the query. The collaborator who owns the content to be shared may select which content to release. In embodiments, the selection may occur automatically based on user preferences and other policies implemented at the content management server. If no content is released, the process silently fails without returning results. The content management service then aggregates and presents results to the collaborator who posed the query for release.

The notification to a collaborator that his content is a candidate matching content item in response to a query from another collaborator may be an email. The collaborator may indicate the release of the candidate matching content item via an indication, such as a reply to the email. The collaborator may also indicate the release of candidate matching content items by navigating to a web interface from clicking the link in the email. Further, the collaborator may also indicate the release of a candidate matching content item by interacting with a rich form in the email. In examples, the indication is affirmative response to a notification that the second collaborator releases content in the query results. Other notification and release formats may be used. For example, a notification may be included in a pop-up box or content management user interface, and the collaborator can use a checkbox for each content item that is a query result to indicate the release of that content item to the collaborator that posed the query. Moreover, the second collaborator may also indicate a blanket approval for the release of matching content items to the first collaborator via permissions set in the content management system.

Figure 5:
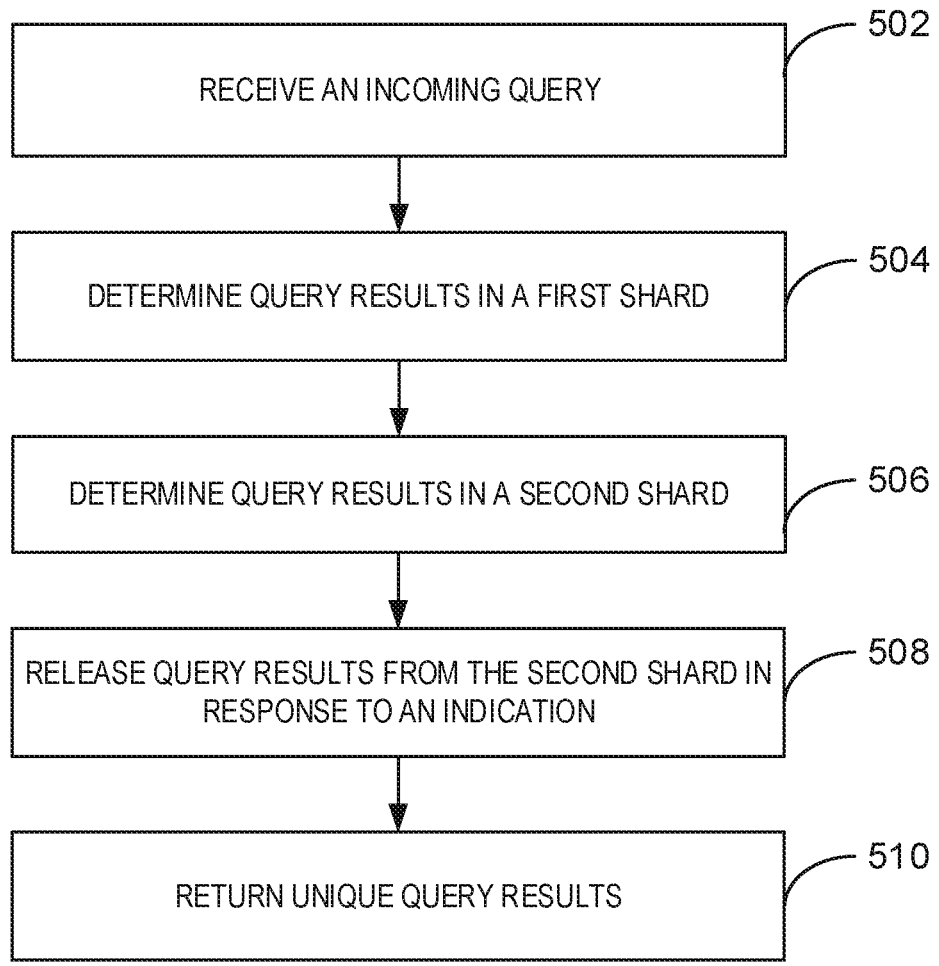
FIG. 5 is a process flow diagram of a method for information sharing in a collaborative, privacy conscious environment.

FIG. 5 is a process flow diagram of a method 500 for information sharing in a collaborative, privacy conscious environment. At block 502, an incoming query is received. In particular, the incoming query is received at a web client/interface and transmitted to a content management system. A relationship between a first collaborator and a second collaborator is maintained by the content management system.

At block 504, query results are determined in a first shard in response to the query. The first shard may be the shard of the collaborator that posed the incoming query. At block 506, query results are determined in a second shard belonging to a second collaborator in response to the incoming query request. At block 508, the candidate query results from content owned by the second collaborator are released in response to an indication from the second collaborator. In embodiments, the indication from the second collaborator may be in response to an email that presents the matching content items from the second collaborator's shard. The second collaborator may then approve the release of results via a response to the email. At block 510, the unique query results are returned to the first collaborator.

Figure 6:
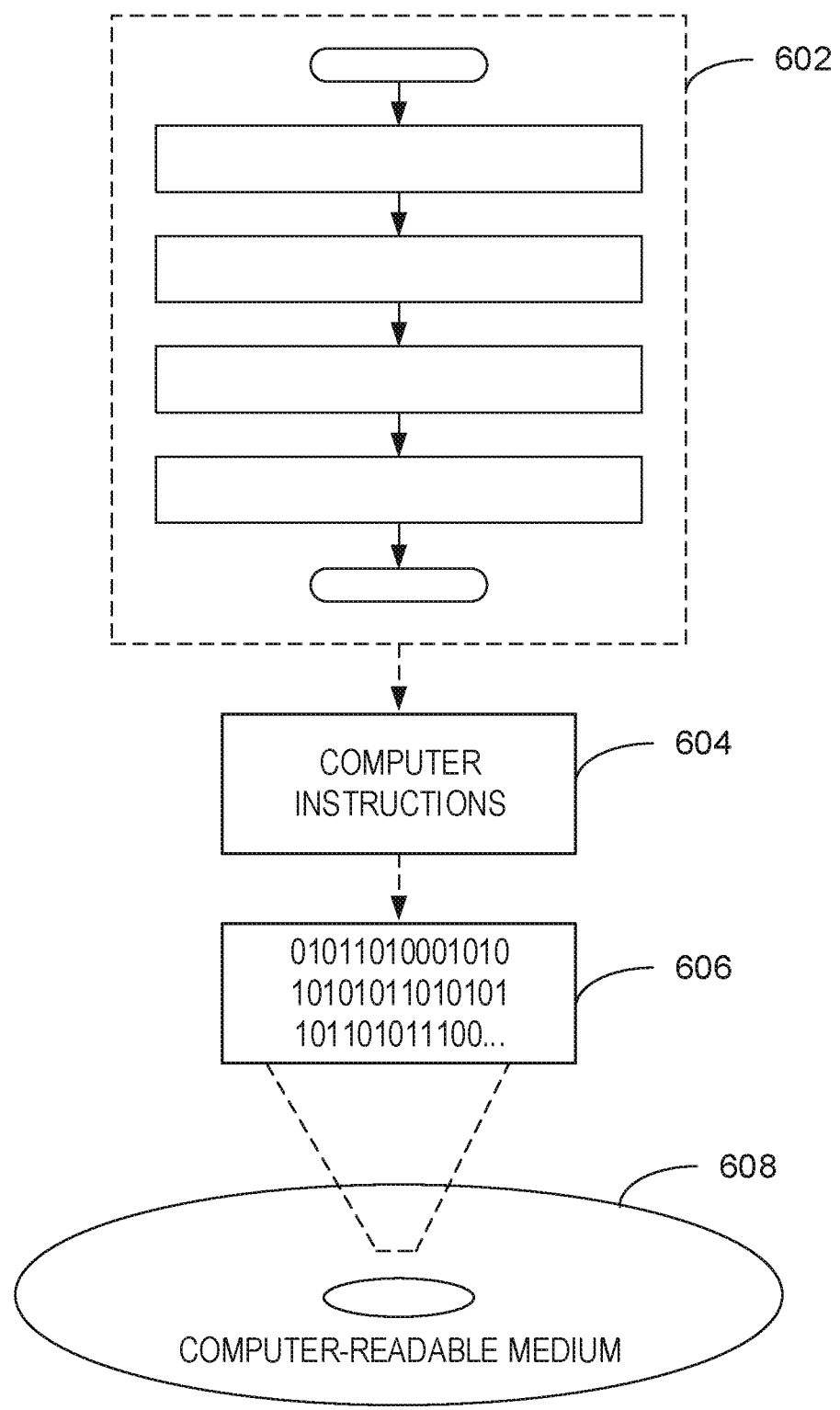
FIG. 6 is a block diagram illustrating an exemplary computer readable medium encoded with instructions to configure/operate information sharing in a collaborative, privacy conscious environment according to aspects of the disclosed subject matter.

Turning to FIG. 6, FIG. 6 is a block diagram illustrating an exemplary computer readable medium encoded with instructions to configure/operate information sharing in a collaborative, privacy conscious environment according to aspects of the disclosed subject matter. More particularly, the implementation 600 comprises a computer-readable medium 608 (e.g., a CD-R, DVD-R or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 500 of FIG. 5, for example. In another such embodiment, the processor-executable instructions 604 may be configured to implement a system, such as at least some of the exemplary system 700 of FIG. 7, as described below. Many such computer-readable media may be devised by those of ordinary skill in the art that are configured to operate in accordance with the techniques presented herein.

Turning to FIG. 7, FIG. 7 is a block diagram illustrating an exemplary computing device 700 configured as a search engine according to aspects of the disclosed subject matter. The exemplary computing device 700 includes one or more processors (or processing units), such as processor 702, and a memory 704. The processor 702 and memory 704, as well as other components, are interconnected by way of a system bus 710. The memory 704 typically (but not always) comprises both volatile memory 706 and non-volatile memory 708. Volatile memory 706 retains or stores information so long as the memory is supplied with power. By contrast, non-volatile memory 708 is capable of storing (or persisting) information even when a power supply is not available. Generally speaking, RAM and CPU cache memory are examples of volatile memory 706 whereas ROM, solid-state memory devices, memory storage devices, and/or memory cards are examples of non-volatile memory 708.

The processor 702 executes instructions retrieved from the memory 704 (and/or from computer-readable media, such as computer-readable medium 608 of FIG. 6) in carrying out various functions of information sharing in a collaborative privacy conscious environment as described above. The processor 702 may be comprised of any of a number of available processors such as single-processor, multi-processor, single-core units, and multi-core units.

Figure 8:
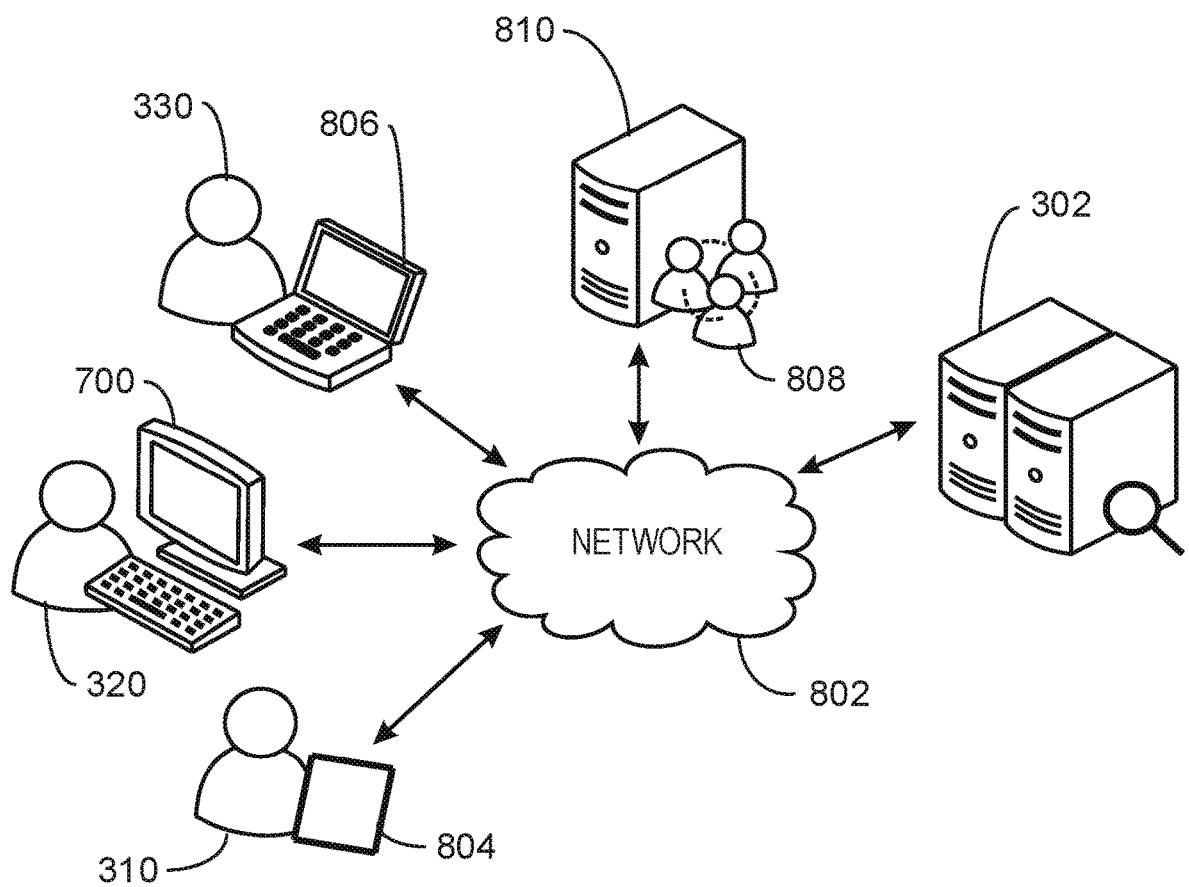
FIG. 8 is a block diagram illustrating an exemplary network environment suitable for implementing aspects of the disclosed subject matter.

Further still, the illustrated computing device 700 includes a network communication component 712 for interconnecting this computing device with other devices and/or services over a computer network, including other user devices, such as user computing devices 804, 806, and 810 as illustrated in FIG. 8. The network communication component 712, sometimes referred to as a network interface card or NIC, communicates over a network (such as network 802) using one or more communication protocols via a physical/tangible (e.g., wired, optical, etc.) connection, a wireless connection, or both. As will be readily appreciated by those skilled in the art, a network communication component, such as network communication component 712, is typically comprised of hardware and/or firmware components (and may also include or comprise executable software components) that transmit and receive digital and/or analog signals over a transmission medium (i.e., the network.)

The computing device 700 also includes an I/O subsystem 714. As will be appreciated, an I/O subsystem comprises a set of hardware, software, and/or firmware components that enable or facilitate inter-communication between a user of the computing device 700 and the processing system of the computing device 700. Indeed, via the I/O subsystem 714 a computer operator may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer operator and the computing device 700 is enabled via the I/O subsystem 714 of the computing device.

The computing device 700 further comprises a query processor 720 and a query request handler 724. The query processor 720 and query request handler 724 may be independent executable modules that are configured (in execution) as follows. In operation/execution, the query request handler 724 intercepts the federated search request from the content management server. The query processor 720 may execute a search via an index 726 stored on a personal shard. In embodiments, the user index is an indexed store of references to content that can be searched. The query processor may identify a set of ordered matching content items that satisfy the query. In embodiments, user preferences 728 may store information regarding the relationships of a particular user. The preferences may be used to enable a second check of the collaborative relationships of a user.

Turning now to FIG. 8, FIG. 8 is a block diagram illustrating an exemplary network environment 800 suitable for implementing aspects of the disclosed subject matter. The network environment 800 includes user computers 700, and 804, 806, and 810. Each user computer corresponds to a computer user. Thus, user computers 700, and 804, 806, 810 correspond to computer users/collaborators 310, 320, 330, and 808, respectively. As suggested above, a computer user, such as computer user 310, submits a query which may be federated and executed by the content management system. If the results of a search of the shard of the user computer 804 are unsatisfactory, the query may be transmitted to other collaborators in the form of a federated search request via the network 802. Thus, the first collaborator may provide an indication that a further search across content owned by the other collaborators is desired. The content management service executing on the content management server 302 may determine relationships between users/collaborators 310, 320, 330, and 808, and federate the query. The federated search request is then transmitted to users/collaborators 320, 330, and 808 based on the identified relationship between collaborator 310 and users/collaborators 310, 320, 330, and 808 as described above. A local content management client executing on the device of each of users/collaborators 320, 330, and 808, may verify the relationship with collaborator 310. The unique matching content items, if any, are then returned to the collaborator 310 that originally posed the query.

While various novel aspects of the disclosed subject matter have been described, it should be appreciated that these aspects are exemplary and should not be construed as limiting. Variations and alterations to the various aspects may be made without departing from the scope of the disclosed subject matter.

EXAMPLES

Example 1 is a method. The method includes receiving a query from a first collaborator at a content management system, wherein a relationship between the first collaborator and a second collaborator is maintained by the content management system; determining query results in content stored at a second shard belonging to the second collaborator in response to the query, wherein the query results are relevant to a search based on the received query; releasing the query results from the second shard in response to an indication from the second collaborator; and returning the released query results to the first collaborator.

Example 2 includes the method of example 1, including or excluding optional features. In this example, the indication from the second collaborator enables the release of the query results by notifying the second collaborator of the query results and obtaining approval of the release of the query results to the first collaborator.

Example 3 includes the method of any one of examples 1 to 2, including or excluding optional features. In this example, the content management system brokers the query results retrieved from the second shard by de-duplicating the query results.

Example 4 includes the method of any one of examples 1 to 3, including or excluding optional features. In this example, the query results are determined via a federated search over the content of the second shard.

Example 5 includes the method of any one of examples 1 to 4, including or excluding optional features. In this example, the method includes determining a first query result via a federated search at a first shard owned by the first collaborator; and de-duplicating the first query result and the query results from the second shard prior to releasing the query results from the second shard in response to an indication from the second collaborator.

Example 6 includes the method of any one of examples 1 to 5, including or excluding optional features. In this example, the relationship between the first collaborator and the second collaborator is defined by a set of permissions enunciated by each of the first collaborator and the second collaborator and stored in an access graph.

Example 7 includes the method of any one of examples 1 to 6, including or excluding optional features. In this example, the query results are unique query results that represent unique content as compared to other search results found at other shards.

Example 8 includes the method of any one of examples 1 to 7, including or excluding optional features. In this example, a second content management client located on the second shard receives the query request and validates the relationship between the first collaborator and the second collaborator prior to transmitting the query results to a content management server.

Example 9 includes the method of any one of examples 1 to 8, including or excluding optional features. In this example, the content stored at the second shard comprises electronic messaging data, electronic mail data, web-based collaborative platform data, cloud storage data, or any combination thereof.

Example 10 is a system. The system includes a web client to receive a query from a first collaborator, wherein a relationship between the first collaborator and a second collaborator is maintained by a content management system; a search federator to federate the query and issue a federated search request based on the query from the first collaborator to the second collaborator; a second query processor to determine remote query results at a second shard belonging to the second collaborator in response to a federated search request from the search federator; and a content management server executing a content management service to release query results from content on the second shard owned by the second collaborator to the first collaborator.

Example 11 includes the system of example 10, including or excluding optional features. In this example, the content management service comprises an access graph that stores information to determine the relationship between the first collaborator and a second collaborator.

Example 12 includes the system of any one of examples 10 to 11, including or excluding optional features. In this example, the content management system brokers the query results retrieved from the second shard by de-duplicating the query results.

Example 13 includes the system of any one of examples 10 to 12, including or excluding optional features. In this example, the content management system comprises a plurality of content management clients and the content management server, wherein each content management client is located on a shard of a collaborator.

Example 14 includes the system of any one of examples 10 to 13, including or excluding optional features. In this example, the system includes a first query processor to determine a first query result via a federated search at a first shard owned by the first collaborator; and de-duplicating the first query result and the query results from the second shard prior to releasing the query results from the second shard in response to an indication from the second collaborator.

Example 15 includes the system of any one of examples 10 to 14, including or excluding optional features. In this example, the content management service releases query results from content on the second shard owned by the second collaborator in response to an approval of the release by the second collaborator.

Example 16 is a computer readable medium bearing computer executable instructions. The computer-readable medium includes instructions that direct the processor to receiving a query from a first collaborator at a content management system, wherein a relationship between the first collaborator and a second collaborator is maintained by the content management system; determining query results in content stored at a second shard belonging to the second collaborator in response to the query, wherein the query results are relevant to a search based on the received query; releasing the query results from the second shard in response to an indication from the second collaborator; and returning the released query results to the first collaborator.

Example 17 includes the computer-readable medium of example 16, including or excluding optional features. In this example, the indication from the second collaborator enables the release of the query results by notifying the second collaborator of the query results and obtaining approval of the release of the query results to the first collaborator.

Example 18 includes the computer-readable medium of any one of examples 16 to 17, including or excluding optional features. In this example, the content management system brokers the query results retrieved from the second shard by de-duplicating the query results.

Example 19 includes the computer-readable medium of any one of examples 16 to 18, including or excluding optional features. In this example, a second content management client located on the second shard receives the query request and validates the relationship between the first collaborator and the second collaborator prior to transmitting the query results to a content management server.

Example 20 includes the computer-readable medium of any one of examples 16 to 19, including or excluding optional features. In this example, the computer-readable medium includes determining a first query result via a federated search at a first shard owned by the first collaborator; and de-duplicating the first query result and the query results from the second shard prior to releasing the query results from the second shard in response to an indication from the second collaborator.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method, comprising:
   receiving a query from a first collaborator at a content management system, wherein a relationship between the first collaborator and a second collaborator is maintained by the content management system;
   in response to receiving the query, determining first and second query results in content stored at a first shard corresponding to the first collaborator and at a second shard belonging to the second collaborator in response to the query, respectively, wherein the first and second query results are relevant to a search based on the received query in the content stored at the first and second shards, respectively;
   upon receiving an input releasing the second query results from the second shard in response to an indication from the second collaborator, aggregating the determined first and second query results; and
   returning the aggregated first and second query results to the first collaborator.

2. The method of claim 1, wherein the indication from the second collaborator enables the release of the second query results by notifying the second collaborator of the second query results and obtaining approval of the release of the second query results to the first collaborator.

3. The method of claim 1, wherein the content management system brokers the second query results retrieved from the second shard by de-duplicating the first and second query results.

4. The method of claim 1, wherein the second query results are determined via a federated search over the content of the second shard.

5. The method of claim 1, comprising:
   de-duplicating the first query result and the second query results from the second shard prior to releasing the aggregated first and second query results from the second shard in response to an indication from the second collaborator.

6. The method of claim 1, wherein the relationship between the first collaborator and the second collaborator is defined by a set of permissions enunciated by each of the first collaborator and the second collaborator and stored in an access graph.

7. The method of claim 1, wherein the second query results are unique query results that represent unique content as compared to other search results found at other shards.

8. The method of claim 1, further comprising validating the relationship between the first collaborator and the second collaborator prior to transmitting the second query results to the content management server.

9. The method of claim 1, wherein the content stored at the second shard of the second collaborator comprises electronic messaging data, electronic mail data, web-based collaborative platform data, cloud storage data, or any combination thereof.

10. A computing system, comprising:
a processor; and
a memory operatively coupled to the processor, the memory including instructions executable by the processor to cause the computing system to:
receive a query from a first collaborator, wherein a relationship between the first collaborator and a second collaborator is maintained by a content management system;
in response to receiving the query, query a first shard corresponding to the first collaborator to generate local query results and federate the query and issue a federated search request to a second shard corresponding to the second collaborator based on the query from the first collaborator to the second collaborator;
determine remote query results at the second shard belonging to the second collaborator in response to the issued federated search request; and
upon receiving an input to release the remote query results from content on the second shard owned by the second collaborator to the first collaborator, aggregate the local and remote search results and return the aggregated first and second query results to the first collaborator.

11. The computing system of claim 10, wherein the content management service comprises an access graph that stores information to determine the relationship between the first collaborator and a second collaborator.

12. The computing system of claim 10, wherein the content management system brokers the query results retrieved from the second shard by de-duplicating the query results.

13. The computing system of claim 10, wherein the content management system comprises a plurality of content management clients and the content management server, wherein each content management client is located on a shard of a collaborator.

14. The computing system of claim 10, wherein the memory includes additional instructions executable by the processor to cause the computing system to:
de-duplicating the local query results and the remote query results from the second shard prior to releasing the aggregated local and remote query results.

15. The computing system of claim 10, wherein the content management service releases the second query results from content on the second shard owned by the second collaborator in response to an approval of the release by the second collaborator.

16. A computer readable medium bearing computer executable instructions which, when executed on a computing system comprising at least a processor, carry out a method for sharing information in a collaborative, privacy conscious environment, the method comprising:
receiving a query from a first collaborator at a content management system, wherein a relationship between the first collaborator and a second collaborator is maintained by the content management system;
in response to receiving the query, determining first and second query results in content stored at a first shard corresponding to the first collaborator and at a second shard belonging to the second collaborator in response to the query, respectively, wherein the first and second query results are relevant to a search based on the received query in the content stored at the first and second shards, respectively; and
upon receiving an input releasing the second query results from the second shard in response to an indication from the second collaborator, aggregating the determined first and second query results and returning the aggregated first and second query results to the first collaborator.

17. The computer readable medium of claim 16, wherein the indication from the second collaborator enables the release of the second query results by notifying the second collaborator of the second query results and obtaining approval of the release of the second query results to the first collaborator.

18. The computer readable medium of claim 16, wherein the content management system brokers the second query results retrieved from the second shard by de-duplicating the first and second query results.

19. The computer readable medium of claim 16, further comprising validating the relationship between the first collaborator and the second collaborator prior to transmitting the second query results to a content management server.

20. The computer readable medium of claim 16, comprising:
de-duplicating the first query result and the second query results from the second shard prior to releasing the query results from the second shard in response to an indication from the second collaborator.

* * * * *